Aug. 21, 1951  M. WALLACE  2,565,008
STRATOGRAPH
Filed Feb. 18, 1947  3 Sheets-Sheet 1
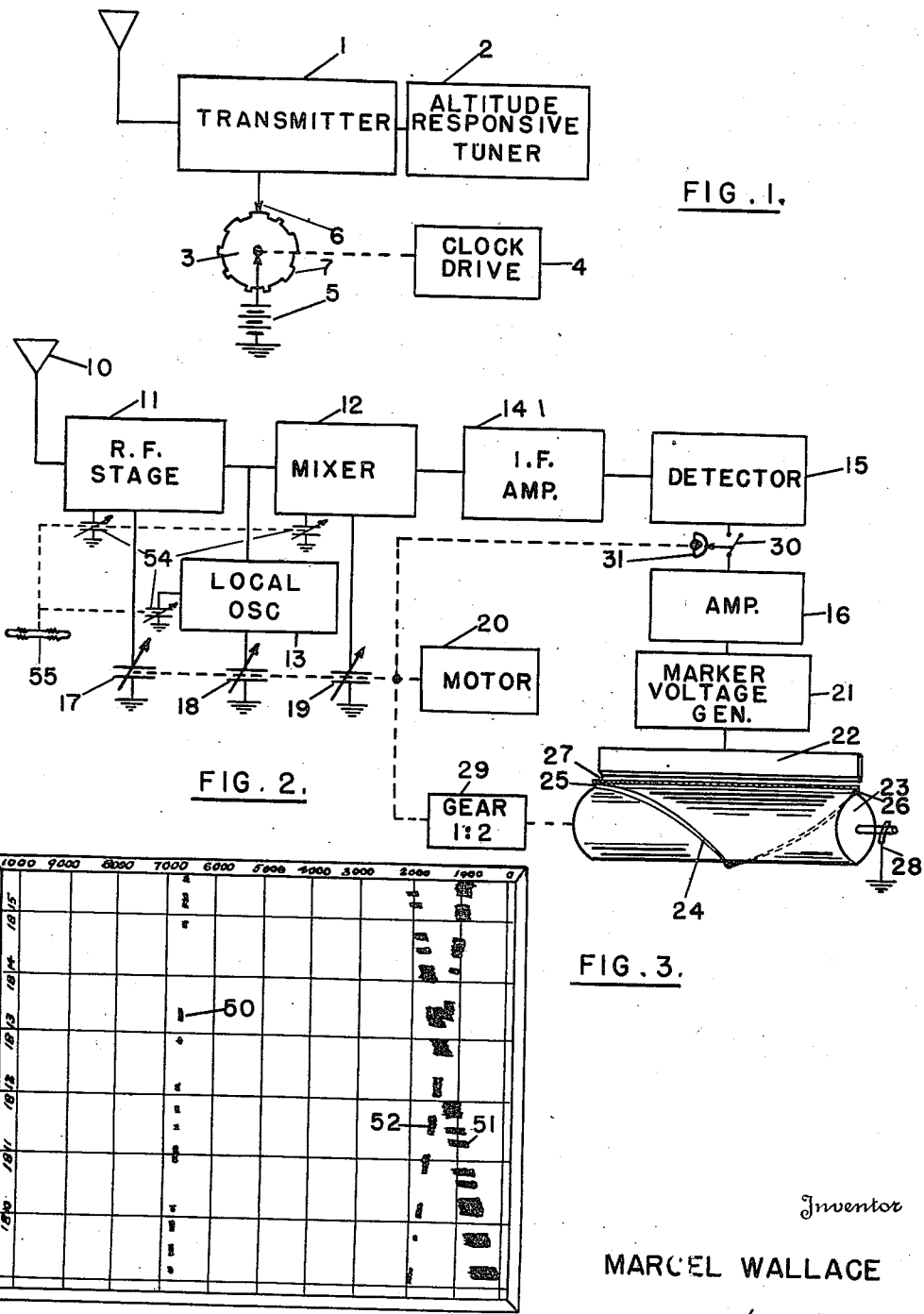
Inventor
MARCEL WALLACE

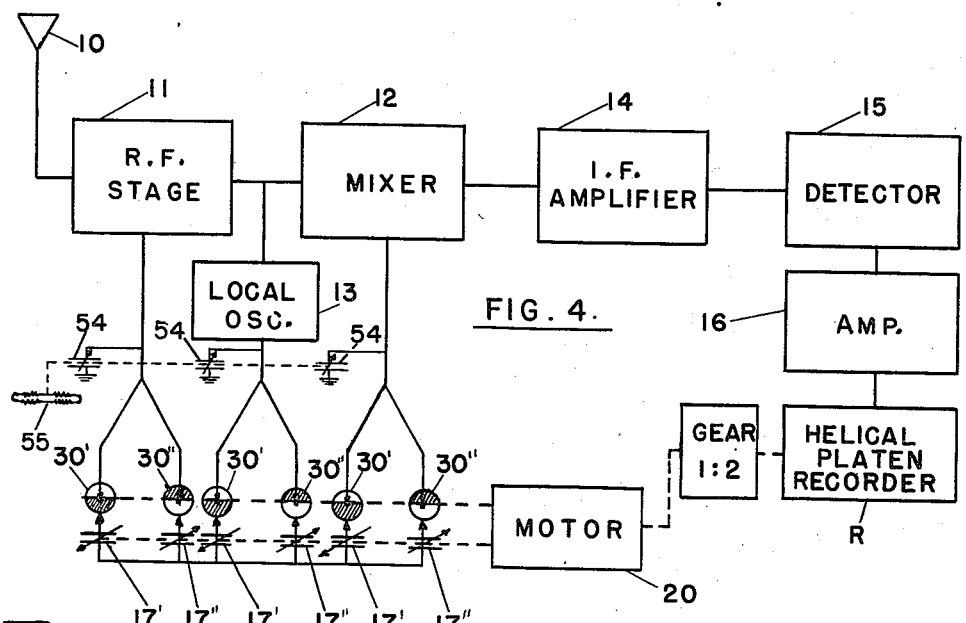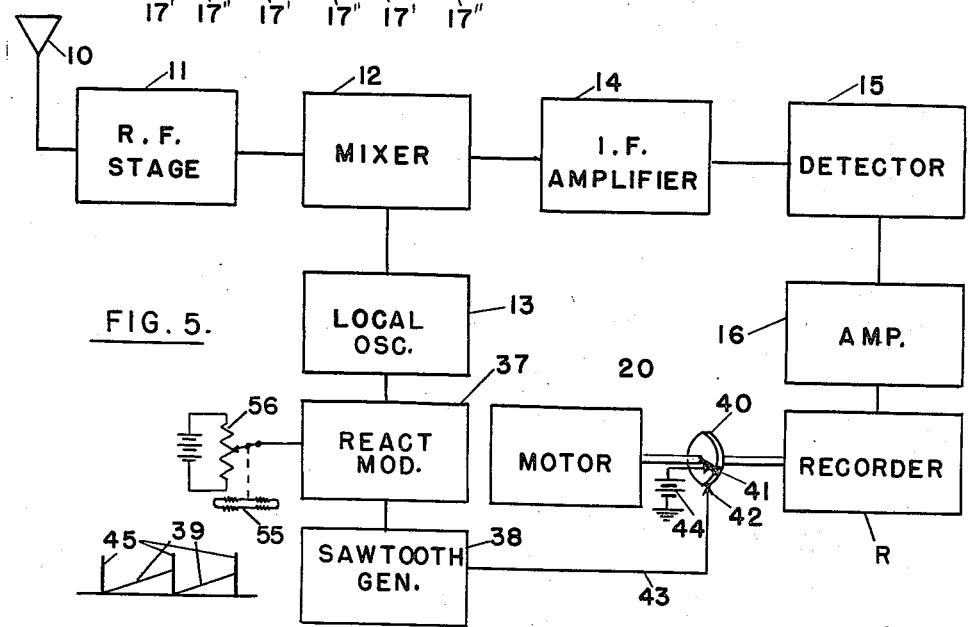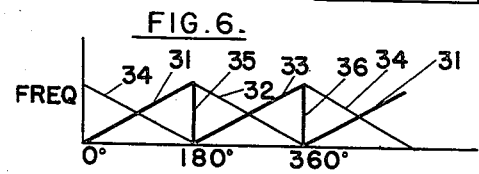

Aug. 21, 1951 M. WALLACE 2,565,008
STRATOGRAPH
Filed Feb. 18, 1947 3 Sheets-Sheet 3

Inventor
MARCEL WALLACE
By Hyman Hurwitz
Attorney

Patented Aug. 21, 1951

2,565,008

UNITED STATES PATENT OFFICE 2,565,008

STRATOGRAPH

Marcel Wallace, East Port Chester, Conn., assignor, by mesne assignments, of one-half to Marcel Wallace, doing business as Panoramic Laboratories, East Port Chester, Conn.

Application February 18, 1947, Serial No. 729,378

7 Claims. (Cl. 250—1)

This invention relates generally to navigational and traffic control systems and more particularly to systems for continuously recording information having significance with respect to one or more navigational parameters associated with each of a plurality of objects, preferably aircraft.

While the number of mishaps presently occurring in the course of aerial travel is not unduly great in relation to the total number of miles traveled by air, it is, nevertheless, sufficiently great to render probable the conclusion that by adopting adequate aids to navigation and traffic control the total number of mishaps might be radically reduced.

It appears, since aircraft are normally equipped with means for communicating with ground stations or landing fields, that one fertile avenue of approach to the problem of increasing the safety of aerial navigation and traffic is to provide at the ground station a continuous record of certain navigational parameters associated with each aircraft in the vicinity of the station. Reference to this record will render apparent the values of simultaneous pertinent navigational parameters associated with each aircraft, as well as the past values and future trends of the said values. By observation of such records ground personnel may be better enabled to guide aircraft, or to warn them of danger.

Still further, questions of responsibility for air mishaps are often of great importance, and evidence of apparent negligence which might be deducible from a permanent record of navigational parameters associated with each aircraft within a given radius of an airfield might dispel the necessity for costly legal actions, by determining responsibilities beyond question. The knowledge on the part of pilots that their positions were being continuously monitored and recorded may be expected to have a tendency to cause more rigid compliance with airways regulations than might otherwise be the case.

The present invention, in its simplest manifestation, provides for the transmission, from each of a plurality of aircraft, of a signal at a frequency bearing a definite relation to the altitude of the transmitting aircraft. A panoramic receiver, and I use that term as meaning broadly a receiver of the frequency scanning type, whether utilized with or without a cathode ray tube indicator, is utilized for scanning the frequency band allocated to altitude representative transmissions, the normal frequency scanning action of the receiver being synchronized with the spatial scanning action of a facsimile recorder of the type which operates by scanning successive lines. The output of the scanning receiver controls recording, thus providing a continuous indication and record of altitudes of aircraft participating in the system.

Since a record which indicates the altitudes of aircraft without identifying each aircraft loses much of its possible significance, I further provide for the modulation or interruption of the transmissions from each altitude responsive transmitter as by means of a keying wheel, the character of the keying being significant of the identification of the associated aircraft. The record as produced at the ground station will then be interrupted in accordance with an identifying code.

While a continuous and permanent record of the altitudes and identifications of aircraft in the vicinity of a ground station is, in itself, of considerable value, the supplementation of such a record by further information of navigational significance increases considerably the ultimate value of the record.

It has been found that the transmissions received at the ground station, originating as they do at substantially identical amplitude, are attenuated in transmission by a factor dependent primarily on distance between transmitter and ground receiver, and accordingly, that the amplitude of each signal as received at the ground station is a measure of the range of the transmitter originating that signal. The receiving and translating equipment utilized in the practice of the invention provides markings having a characteristic which depends upon the amplitude of received signals, and accordingly, the record ultimately produced represents not only altitude and aircraft identification, but also range, of signal originating transmitters.

It is an object of the present invention to provide an apparatus and a method for providing a continuous record of the values of one or more navigational parameters associated with each of a plurality of discrete objects.

It is a further object of the invention to provide an apparatus, and a method, for modulating with identifying codes records of values of selected navigational parameters associated with discrete objects, so that each record may be unmistakably and definitely associated with a specific one of the discrete objects.

Still a further object of the invention resides in providing a system of navigational aid and traffic control for aircraft wherein the position of a mark on a record receiving surface is indicative of the value of a navigational parameter of an aircraft and wherein the character of the mark is indicative of further information of a navigational character.

In greater detail, it is an object of the present invention to provide a method and system for transmitting signals from a plurality of aircraft, which, when received, translated and recorded provide a continuous time correlated record of the altitude, range and identification of each of the plurality of aircraft.

It is still a further object of the present invention to provide a method and system of the above character, wherein signals may be received, translated and recorded only when such signals emanate in a given azimuthal bearing or bearing sector.

The above and still further objects, features and advantages of the invention will become evident upon consideration of the following detailed descriptions of three embodiments thereof, especially when taken in conjunction with the accompanying drawings, wherein:

Figure 1 is a functional block diagram of a single airborne transmitter arranged in accordance with the invention;

Figure 2 is a functional block diagram of an embodiment of a ground receiving and translating system and a conventionalized illustration of a recording system constructed and arranged in accordance with the invention;

Figure 3 represents the appearance of a typical record as made by the apparatus of the present invention;

Figure 4 is a functional block diagram of a further embodiment of the ground receiving and recording equipment of the invention;

Figure 5 is a functional block diagram of still another embodiment of the ground receiving and recording equipment, which utilizes electronic scanning of the frequency scanning receiver;

Figure 6 is a graph utilized in explaining the tuning action of the condenser assembly of Figure 4;

Figure 7:
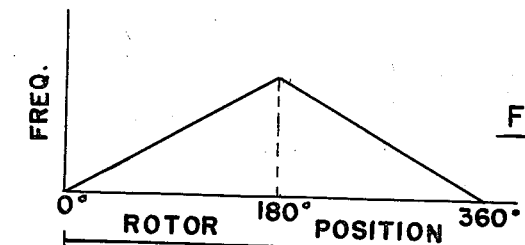
Figure 7 is a plot of frequency against time, such as occurs in a still further embodiment of the present invention.

Referring now more specifically to the drawings, and particularly to Figure 1 thereof, the reference numeral 1 represents a transmitter, which may be tuned by an altitude responsive device 2, comprising an aneroid cell or its equivalent (not shown), or by any one of the various forms of absolute altimeter (not shown), in a manner which is per se well known in the prior art, and which is illustrated and explained in considerable detail in U. S. Patent No. 2,378,604, issued to M. Wallace. The frequency of emission of the transmitter 1 will, accordingly, be representative of the altitude of a body, such as, for example, an aircraft, within which the transmitter 1 may be mounted, and as the altitude of the body varies, so also will the frequency of transmission of the associated transmitter 1 vary. It has been suggested that a convenient frequency range for allocation to altitude representation is 150–155 mc., representing a range of 0–10,000 ft., each .5 mc. variation in frequency thus corresponding to a change in altitude of 1000 ft.

The transmitter 1 may be keyed off and on by means of a code wheel 3, rotated slowly by a clock 4 or its equivalent, and which serves to apply operating potential to the transmitter 1 from a voltage source conventionally represented at 5, at such times only as the contact 6 rests on a raised position 7 of the periphery of the electrically conducting code wheel 3. The raised portions 7 of the periphery of the code wheel 3 may be of suitable length and suitably spaced to cause coded emissions from the transmitter 1, which may be of any desired character, the code utilized for each body, or aircraft, being distinguishable, however, from that utilized by all other aircraft utilizing the present system.

Summarizing briefly the operation of the apparatus illustrated in Figure 1, and which has been heretofore described in detail, the transmitter 1 transmits signals at a frequency bearing a definite relation to the altitude of the transmitter. The transmitter is rendered identifiable by slowly interrupting its transmissions in accordance with an identifying code, by means of a clock driven code wheel 3. It will, of course, be realized that in the practice of the present invention a plurality of aircraft will normally be located in the vicinity of a ground station at any particular time, and that all such aircraft, being similarly equipped, will simultaneously provide transmissions of the character above described.

Suitable apparatus for interpreting, translating and recording transmissions from the various aircraft located adjacent a ground station, or landing field, is illustrated in Figure 2 of the drawings, the character of the record made being illustrated in Figure 3. Reference is presently made to these figures in connection with the following detailed description of a recording station arranged in accordance with the present invention.

At the ground station I utilize a frequency scanning radio receiver which scans continuously the band of frequencies allocated to altitude representation, which, in the present example; is constituted of the band 150–155 mc. The receiver itself comprises an antenna 10, an R. F. stage 11, a mixer 12 and a local oscillator 13, the outputs of the local oscillator 13 and of the R. F. stage 11 being applied to the mixer 12, wherein by reason of heterodyning action, an intermediate or difference frequency is generated, in a manner well known per se in the art involving superheterodyne receivers, the said intermediate or difference frequency being amplified in an intermediate frequency amplifier 14, the output of which is applied to an amplitude detector 15, the output of the latter being in turn amplified by an amplifier 16. The frequency scanning action, hereinbefore referred to, is caused by varying the capacity values of tuning condensers 17, 18 and 19, associated respectively with the R. F. stage 11, mixer 12, and local oscillator 13, and which are continuously rotated, at a preferred rate of 7 R. P. S. by means of a motor 20, causing the receiver to be responsive in succession to each frequency in its operative band, and the scanning action to be periodic and indefinitely and cyclically repeated.

Since the detector 15 is of the type suited for detecting amplitude of impressed carrier, the output of the detector 15 and of the amplifier 16 is represented primarily by a D. C. voltage, which has a magnitude dependent on the amplitude of incoming R. F. signals, being zero in the absence of such signals. The output of the amplifier 16 is utilized to control the output from a marker voltage generator 21, the output of which may be applied to a marker 22. The motor 20, in addition to driving the frequency condensers 17, 18 and 19 may be utilized to drive in synchronism a cylindrical member 23, having a helical raised platen portion 24 secured thereto, which extends about the cylinder for a total of one turn, the one turn entirely encompassing the cylindrical member 23, and the pitch of the helical portion 24 being such as to provide an element of the helix for each element of altitude of the cylinder 23. The relative phasing of the motion of condensers 17, 18, 19 and the cylinder 23 is such as to cause the extremity 25 of helix 24 to be immediately adjacent to marker 22 when the receiver is tuned to its minimum frequency (150 mc.), corresponding with zero altitude, and such as to cause the extremity 26 of the helix to be immediately adjacent the marker 22 when the receiver is tuned to its maximum frequency (155 mc.) corresponding with maximum altitude (10,000 ft.).

Since the frequency characteristic of a conventional straight line-frequency variable condenser is generally of pyramidal shape, the frequency increasing linearly with rotor shaft motion for 180° and thereafter decreasing in a relatively linear fashion for the remaining 180° of rotation of the rotor shaft, while the scanning helical platen utilized in the preferred mode of practicing the present invention travels in only one direction, linearly with time, it follows that the platen must complete a cycle of rotation during one half cycle or 180° of operation of the condenser and while the frequency of the receiver is increasing, and that the receiver must be disabled during the remaining half cycle or 180° of rotation, while the frequency is decreasing to zero. As a consequence, the condensers 17, 18 and 19 must travel at one half the rotational velocity of the helical platen 24. To accomplish the proper relative speed between the condensers 17, 18 and 19 and the helical platen 24, the condensers may be driven directly from the motor 20, while the helical platen 24 is driven from the motor 20 through a speed increasing gearing 29, which provides a speed change in the ratio 1:2. The recorder energizing circuit comprising marker voltage generator 21 is disabled during the undesired half cycle of condenser rotation by means of a switch 30, which is controlled by means of a cam 31 driven from the motor 20, or by some equivalent mechanism.

A time calibrated record receiving surface 27 is maintained between the marker 22 and the cylinder 23, and in contact therewith, and is fed at some convenient rate, say 6" per minute, by means of a clockwork mechanism (not shown). The record receiving surface 27 may be constituted of suitably chemically treated paper, of such character that passage of current therethrough will cause a mark to appear on the paper. In the present instance current is caused to flow through the paper 27 by applying voltage to the marker 22, the cylinder 23 and the helical member 24 being constructed of metal and grounded, as indicated at 28, to provide a path to ground for the record producing current. The paper 27 is maintained in conductive condition, preferably slightly moist, and is dried after recording, and is collected, by means of apparatus which is known per se, and is accordingdy neither illustrated nor described herein. Voltage is applied to the marker 22 by the marker voltage generator 21, which in the present apparatus may be an amplifier having low internal impedance, and which is capable of supplying sufficient current flow to produce clear sharp markings on the paper 27.

While I have illustrated and described the present system in conjunction with a recorder which functions by transmitting current through chemically treated paper, and in which a helical scanning platen is employed, the present system lends itself to use with recorders of various types and operating upon various principles. For example, I may utilize a generator 21 which is capable of creating a disruptive spark or other electrical discharge from marker 22 to platen 24, through recording surface 27, in which case chemically treated paper may be unnecessary. Alternately, I may cause the marker 22 to vibrate mechanically in response to signal output from generator 21, that output being of alternating character, and of high frequency (of the order of 5000 cycles per second) and controlled by the output of the amplifier 16, in which case recording may be accomplished by impacting an inked ribbon or so-called "carbon-paper" against the paper 27, the latter being backed by the platen 24. Still further, I may employ recorders operating upon principles remote indeed from that upon which operates the recorder presently described and illustrated, it being required only that a record creating mechanism is caused to scan periodically, and in synchronism with a tuning operation, over a time fed or actuated record receiving surface, and is caused to record in response to reception of signals. In operation, the receiver of Figure 2, as it scans periodically through its assigned frequency spectrum, transmits a signal to the marker voltage generator 21 upon scanning through any existing signal. The I. F. amplifier 14, having a finite frequency response characteristic, passes signals during a predetermined finite sector of scan of the condensers 17, 18, 19, resulting in a mark on the record receiving surface 27 which has extremely small but finite length laterally of the paper. The actual period during which appreciable response of the receiver to any given signal takes place is a function of the static and dynamic selectivity of the receiver as well as of the amplitude of the received signal. Accordingly, it will be clear that for signals originating remotely of the receiving station, and hence received at low amplitude, the lateral extent of recorded signal will be slight, whereas signals transmitted from positions adjacent to the receiving station will be received at considerably greater amplitude and will cause recorded signals of correspondingly greater lateral extent. Observation of the recorded signals will, accordingly, provide information not only as to precise altitudes, and of transmitter identity, but also an approximate indication of transmitter range.

In order that misleading indications of range shall not be provided, by reason of the angle of elevation of transmitters with respect to the ground station, it is essential that a receiving antenna be used which is truly omni-directional and which does not discriminate between signals arriving from different azimuthal or elevational angles. Such antennas are available in the art, and accordingly no specific preferred antenna system is illustrated or described.

Referring now to Figure 3 of the drawings, there are illustrated several records, such as are provided by apparatus arranged in accordance with the invention, each record trace applying to a different aircraft. It will be noted that each of the records is of interrupted character, consisting of recorded portions and spaces therebetween, in accordance with a definite pattern. The phenomenon is, of course, caused by the distinctive code wheel 3 (Figure 1), and each distinct record pattern serves to identify a distinct aircraft.

The record traces themselves have a lateral position corresponding with altitude and a lateral extent corresponding with range, the latter quantity being susceptible of rough estimation. For example, the trace 50 represents an aircraft flying at 6800 ft. altitude, at substantially constant range, which may be estimated at about 25 miles, the signal originating aircraft being identified by the international code letters PBA.

The trace or record 51 represents an aircraft which left the ground at about 18:09—and which at 18:15 was still rising slowly, and had attained an altitude of 2000 ft., its range increasing, and its identifying code being MDU.

The trace 52 shows a craft of slowly decreasing range and altitude, apparently coming in for a landing, and which at 18:15, is at 1000 ft. altitude, its identifying code being TAO.

In order to avoid the necessity for disabling the receiver for half its maximum operating time, or, stated in other terms, in order to increase the duty cycle of the receiver from 50% to 100%, resort may be had to the condenser structure disclosed in the U. S. patent to M. Wallace, No. 2,273,914, issued February 14, 1942. Briefly described, the condenser structure disclosed in U. S. Patent No. 2,303,214 consists of a set of stator plates and two sets of straight line-frequency rotor plates, mounted on a common shaft, but displaced in space phase by 180°. Means are provided for commutating between the two condensers, so that they are operative successively and during successive 180° of rotation of the common shaft. Each set of stator plates is connected in circuit during its period of decreasing capacity or increasing frequency and disconnected during its period of increasing capacity or decreasing frequency. The total effect of both condensers is thus a saw-tooth variation of frequency with condenser shaft rotation, the saw-tooth frequency being twice that of the shaft rotation. Use of such a structure enables continuous operation of the receiver and recorder of the present invention, or a 100% duty cycle, it being required only that the recorder marker or platen be operated at twice the rotational velocity of the shaft of the tuning condensers.

Reference is now made particularly to Figure 4 of the drawings, wherein is illustrated in block diagram an exemplification of a recording system in accordance with the present invention, and wherein the condenser arrangement briefly described in the previous paragraph is utilized.

The antenna 10, the R. F. amplifier 11, the mixer 12, the local oscillator 13, the I. F. amplifier 14, the amplitude detector 15 and the amplifier 16 may be identical in the embodiments of the invention illustrated in Figures 2 and 4, respectively. The recorder is illustrated in block diagram, identified by the letter R, and may be a recorder of the general character illustrated more particularly in Figure 2 of the drawings, and utilizing a helical platen. The motor 20 drives the helical platen of the recorder through a speed step-up gearing 29, and drives directly the tuning condenser assembly associated with the R. F. amplifier 11, the mixer 12 and the local oscillator 13, to attain a rotational speed ratio of 1:2 as between the tuning condensers and the helical platen.

Each of the tunable elements 10, 11 and 12 is associated with a pair of tuning condensers, 17', 17", each condenser being of the straight line frequency type, and the condensers of each pair being dephased by a factor of 180° of rotation. Accordingly, the condensers 17' decrease in capacity linearly, while the parallel connected condensers 17" increase in capacity, and vice versa. The condensers 17' and 17" are connected in circuit alternately by means of commutators or switches 30' and 30", connected in series with the condensers 17' and 17" respectively and rotatable therewith. The switch elements 30' serve to connect the condensers 17' in circuit while the condensers 17' are in the decreasing capacity or increasing frequency phase, as illustrated by the plot 31, Figure 6; switch elements 30' disconnect the condensers 17' from the circuit while the condensers 17' are in the phase of increasing capacity or decreasing frequency, as illustrated by plot 32, Figure 6. The switch elements 30" perform the same function in respect to condensers 17", the frequency characteristics of which are illustrated in Figure 6 by the plots 33 and 34. The overall frequency characteristic of each condenser pair, insofar as it is effective in tuning its associated tunable receiver element is, accordingly, represented by the plots, taken in sequency from left to right in Figure 6, which are identified by the numerals 31, 35, 33, 36, 31. For ease of identification the resultant characteristic showing frequency versus angular shaft position for each condenser pair 17' and 17" has been illustrated by particularly heavy lines in Figure 6.

In operation the condenser assembly comprising condensers 17' and 17" and the associated switch or commutator elements 30' and 30" provide a saw-tooth tuning characteristic for the frequency scanning receiver, at a frequency equal to two times the rotational speed of the condenser shaft. The helical platen of the recorder R is rotated at twice the angular velocity of the condenser shaft, effecting one complete revolution for each frequency scanning operation of the frequency-scanning or panoramic receiver associated therewith.

Still a further embodiment of the present invention is illustrated in functional block diagram in Figure 5 of the drawings, the distinguishing feature of which relates to the fact that a wholly electronic mode of frequency scanning is adopted, as well as to the mode of synchronizing the recorder with the frequency scanning operation.

Referring specifically to Figure 5 of the drawings, there is illustrated an antenna 10, an R. F. amplifier 11, a mixer 12, a local oscillator 13; an I. F. amplifier 14, an amplitude detector 15, and amplifier 16, which may be essentially of the character of those heretofore described in considerable detail in connection with alternative embodiments of the ground equipment utilized in the practice of the invention.

In the embodiment of Figure 5, in contradistinction to the previously described embodiments of the ground equipment, the local oscillator 13, instead of being tuned periodically over the range of values required by means of a mechanically driven condenser or condenser assembly, is caused to vary in frequency by means of a reactance tube frequency modulator 37, the theory of operation of which is per se well known. The reactance tube modulator 37 is in turn controlled by means of a saw-tooth generator 38, which applies to the modulator 37 a saw-tooth voltage 39. The frequency of the oscillator 13 follows the saw-tooth voltage of the generator 38, by virtue of the frequency controlling effect exerted thereon by the reactance tube modulator 37, and the frequency scanning or panoramic receiver, comprising R. F. amplifier 11, mixer 12, local oscillator 13, I. F.

amplifier 14, as well as detector 15 and amplifier 16 is, accordingly, caused to perform its required frequency scanning operation.

Electronically scanned panoramic receivers, of the character above described, have been described and illustrated in great detail in U. S. Patent No. 2,381,940 issued to M. Wallace et al. on August 14, 1945, and entitled "Method and Apparatus for Simultaneous Aural and Panoramic Radio Reception," as well as in U. S. Patent No. 2,279,151 issued to M. Wallace on April 17, 1942, and entitled "Panoramic Radio Receiving Systems" and in U. S. Patent No. 2,378,604, issued to M. Wallace on June 19, 1945, and entitled "Radio Altimeter and Panoramic Reception System." While the above identified patents concern themselves with systems of frequency scanning or panoramic reception wherein frequency responses are displayed on cathode ray tube oscilloscopes, the principles and circuits disclosed therein for accomplishing frequency scanning action in frequency scanning receivers have direct application to the present invention, without regard to the mode of indicating or recording frequency response.

In order to synchronize the operation of the saw-tooth generator 38 with the rotation of the helical platen of the recorder R, a periodic voltage is applied to the saw-tooth generator 38 once for each rotation of the helical platen. This is accomplished by rotatably coupling to the drive shaft for the platen, or to the motor 20 which drives the platen, a wheel 40 constructed of insulating material and having a narrow conducting segment 41. A stationary contact 42 slidably contacts the wheel 40 and is connected to the saw-tooth generator over a lead 43, applying thereto a voltage deriving from a potential source 44. The voltage source 44 is in electrical communication with the contact 42 for only an extremely small instant of time during each cycle of rotation of wheel 40, during which a synchronizing pulse 45 is applied to the generator 38, initiating the saw-tooth voltage indicated by plot 39. The constants of the generator 38 and the timing of the wheel 40 are so selected that the saw-tooth frequency variations of the local oscillator 13 synchronize properly with the action of the recorder R, and are in proper phase relation therewith.

The present apparatus, it is true, fails to display bearing of aircraft. The equipment required for the practice of the present invention is inherently so simple and so economical of manufacture, that where records having directional significance are desired, a separate directional antenna 10 may be erected for each desired direction without undue expense, and a record attained of signals received by each antenna. The record obtained from any one recorder will be susceptible of reliable and easy correlation with the record obtained from any other recorder by reason of the common time scale of all the records.

The recorder of the present invention may be used for "null" or "maximum" signal indications in a simple form of direction finder by providing a suitable orientable directional antenna in conjunction therewith. Upon slowly rotating the antenna, signals may be caused to appear and disappear. Should the antenna be of the loop type, for example, a "null" signal may be obtained from aircraft on a line bisecting the plane of the loop, while for antennas of other known character, a "maximum" signal may be obtained when the antenna is oriented in the direction of signal origination.

While the various apparatus hereinbefore described, are capable of operation with adequate accuracy for the preferred use of the invention, one source of minor error which is susceptible of elimination has not been mentioned. Reference is had to the fact that, when the altitude responsive tuner 2 comprises an aneroid cell, true altitude is not being measured, but rather measurement is being made of atmospheric pressure. Since different ambient atmospheric pressure at sea level may exist during different time periods, the frequencies of signals transmitted by aircraft utilizing the present system are not truly representative of altitude at all times and under all atmospheric conditions. Since, however, the present invention in the course of its normal and preferred use, may be expected to be operative in a limited area only, say within a radius of twenty-five miles of the ground station of the system, it may be assumed that identical atmospheric conditions subsist throughout the system and it is accordingly possible to introduce into the ground receiver a corrective effect, to take account of deviations of local atmospheric pressure from the norm, and thereby to compensate for such variations of frequencies transmitted from the aircraft as are due to similar deviations.

My method of compensating for deviations of atmospheric pressure from the normal is to control the mean frequency of the ground receiver in accordance with atmospheric pressure, by means of instrumentalities which are similar to those utilized in tuning the aircraft transmitters of the system in accordance with altitude, so that the ground receiver will provide a signal to its associated recorder corresponding with, say, zero altitude, in response to transmissions from aircraft which are actually at zero altitude. To accomplish this the local oscillator 13, the R. F. stage 11 and the mixer 12 of the ground receiver may be supplied with supplementary tuning condensers or trimmers 54, which may be controlled in respect to their capacitance by an aneroid cell 55. The I. F. frequency of the ground I. F. amplifier 14 remains fixed. The capacitance of the trimmers 54 is caused to vary with pressure measurements accomplished by the aneroid cell 55 in such manner as to vary the tuning of the R. F. stage 11, the mixer 12 and the local oscillator 13 in accordance with the identical law of variation of tuning with atmospheric pressure which holds for the airborne transmitters 1. Thus any variation of transmitted frequency which may be attributed to a variation of atmospheric pressure from standard, rather than to a change of altitude, is compensated for by a similar variation of the mean frequency of the scanning receiver, and, in consequence, recorded values of altitude are rendered independent of variations of atmospheric pressure from standard.

While the expedient above outlined may be adopted in each of the embodiments of my invention described herein and illustrated in the accompanying drawings, in the case of the embodiment illustrated in Figure 5 of the drawings I have preferred to adopt a variation of the above described system of compensation, since in the latter embodiment the frequency scanning action at the ground receiver takes place by virtue of variation of control voltage of a reactance tube modulator rather than by virtue of mechanical variation of the capacity of a condenser. In the embodiment of the invention which is illustrated in Figure 5 of the drawings, I utilize an aneroid cell 55 for varying the output voltage derivable from a potentiometer 56, the latter applying a control voltage or bias to the reactance tube modulator to determine the minimum or mean frequency of oscillation of the local oscillator 13.

Various other modes may be adopted of tuning the ground receiver of the present system in accordance with local atmospheric pressure, and in response to a measurement made by an aneroid cell and I do not desire, accordingly, to be limited to any specific mode of accomplishing the variation, except as required by the terms of the appended claims. I suggest, merely by way of example, that an aneroid cell responsive trimmer might well be utilized in the embodiment of Figure 5, that compensation for local conditions may be accomplished in the embodiments of Figures 2 and 3 by an aneroid cell controlled reactance tube, instead of by trimmer condensers, and that in all the embodiments of the invention herein described, effective variation of receiver tuning may be accomplished by varying the I. F. frequency in response to an aneroid cell.

Returning again to consideration of the structure illustrated in functional block diagram in Figure 1 of the drawings, and particularly to the clock driven code wheel 3, it will be clear that the contact 6 may be connected electrically with other electrically energized devices borne by the aircraft, for example, the landing lights or running lights of the aircraft, so that the aircraft may, when within sight of a recording station, be directly visually identifiable, and the direct visual identification correlated by observation of the record receiving surface 27. Various modes of accomplishing this result will suggest themselves to those skilled in the art, one preferred mode being to control from the contact 6 a circuit making and breaking relay, the contacts of which are in series with the source of electrical energy applied to the landing or running lights for energizing them.

While I have hereinbefore described and illustrated apparatus for causing to scan in synchronism a record or mark position determining device and mechanical tuning or frequency scanning mechanism for a radio receiver, the tuning mechanism being constructed and arranged, by means of special expedients, to provide effectively a saw-tooth variation of tuning with time, and the spatial scanning mechanism providing a like law of displacement of the mark position determining device with time, it is quite possible to arrange an apparatus wherein the law of variation of tuning with time is of pyramidal character, as in Figure 7, the spatial scanning device operating in accordance with a similar law of space-time variation. Such an arrangement is particularly advantageous since the pyramidal law of variation with time is normal for commercial straight line frequency condensers, when utilized for tuning over their entire 360° of shaft rotation, so that neither the receiver channel disabling means of Figure 2 nor the commutating apparatus of Figure 4 is required.

The simplifications and economies which may be effected in systems according to my invention, by reason of the utilization of a conventional condenser system for effecting frequency scanning, are made possible by virtue of the utilization of a modified recording mechanism, generically similar to the recorder illustrated in considerable detail in Figure 2 of the drawings, but which specifically includes a bi-directional scanning platen, which is disposed about the surface of a right circular cylinder in accordance with a different plan than was adopted in the embodiment of Figure 2, the latter providing uni-directional scanning.

Figure 8:
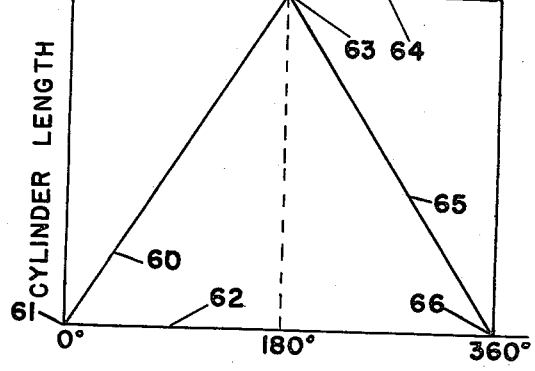
Figure 8 is a development of the surface of a spatial scanning cylinder having a bi-directional helical platen, for utilization in the last mentioned embodiment of the invention.

Reference is made to Figure 8 of the drawings for a view of the developed surface of a right circular cylinder having thereon a raised embossment or platen 60, which may be of triangular cross section, and which extends from one end 61 of a first circumferential edge 62 of the developed surface linearly and transversely to a point 63 midway of an opposite circumferential edge 64 of the developed surface, and thence linearly and transversely back, as at 65, to the remaining end 66 of the edge 62.

It will be readily apparent, upon comparison of Figures 7 and 8 that the law of variation of frequency with condenser rotor position in Figure 7 corresponds precisely with the law of lengthwise displacement of embossment 60 with rotation of the platen bearing cylinder, the pyramidal law of frequency variation being matched by a like pyramidal law of spatial scanning on the part of the platen. Since the recording device as well as the frequency scanning condenser obey analogous laws of time variation, they may be ganged, or driven from a single motor, without requiring speed change gearing, as in Figures 2 to 4, and it then becomes practical to mount the rotating platen and the rotor plates of the frequency scanning condenser or condensers on a single or common shaft with the rotating platen of the recorder, thus achieving notable simplicity in the system.

Figure 9:
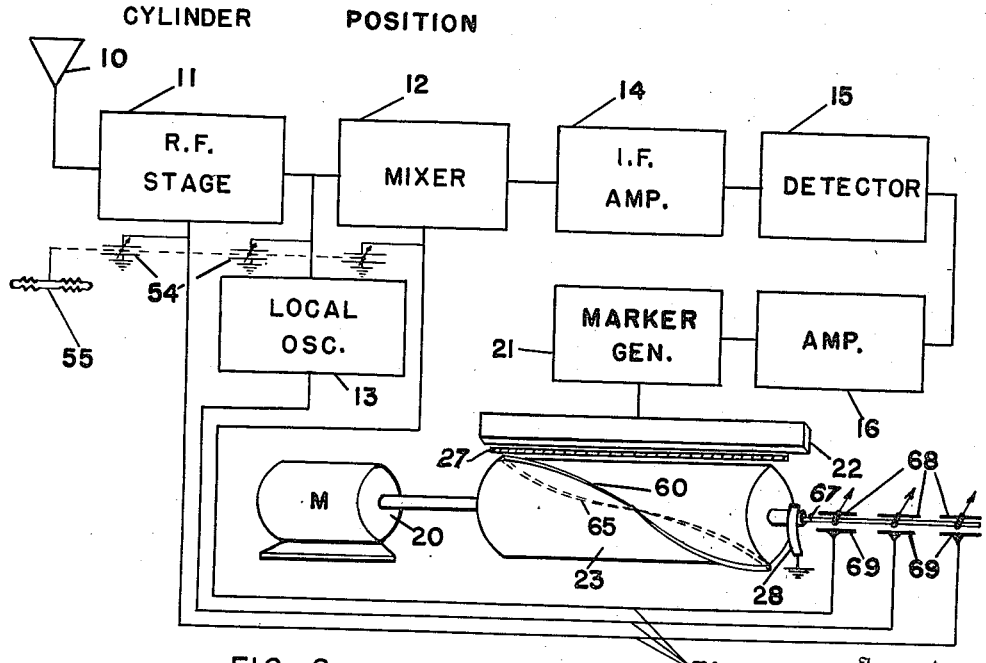
Figure 9 is a functional block diagram of an embodiment of the invention utilizing the bi-directional helical platen of Figure 8.

Reference is now made particularly to Figure 9 of the drawings, wherein is illustrated primarily in functional block diagram a stratograph arranged in accordance with the above principles. The antenna 10, the R. F. amplifier 11, the mixer 12, the local oscillator 13, the I. F. amplifier 14, the detector 15, the amplifier 16, the marker generator 21 and the marker 22 may be arranged, constructed and interconnected as described hereinabove in connection with the embodiment illustrated in Figure 2 of the drawings, and therefore require no further explanation.

The platen bearing cylinder 23 of the embodiment of the invention illustrated in Figure 9 of the drawings, in contradistinction to the previously described embodiments of the invention, no longer carries a raised helical platen, but instead carries a pair of sequentially arranged helical members 60 and 65, each extending longitudinally across the platen bearing cylinder 23 to the full extent of the intended lateral deviations of altitude representative markings, but each limited circumferentially to one-half the surface of the platen bearing cylinder 23. The developed surface of the cylinder 23 with its platen members 60 and 65 corresponds with that illustrated in Figure 7 of the drawings, and which has been hereinbefore described, both in respect to structure and mode of operation, so that the scanning action is bi-directional, i. e., in one direction for 180° of rotation of platen 23 and thereafter in the opposite direction for the remaining 180° of rotation.

Mounted directly on the shaft 67 which carries the cylinder 23, and which is driven by means of motor 20, are the rotor plates 68 of three variable condensers, the stator plates 69 of which are secured to an insulated base, and which may be connected by means of suitable leads 71 to the R. F. stage 11, the mixer 12 and the local oscillator 13, respectively, to vary the tuning thereof periodically between assigned limits, as required by the present system. The shaft 67 may be grounded by means of a brush 28, as in Figure 2, which serves thus to ground the rotor plates 68, and accordingly, as the shaft 67 rotates it causes a pyramidal or bi-directional spatial scanning action of the platens 69 and 65 to take place across the record receiving surface 27, and generates, by virtue of its rotation of the rotor plates 68, a corresponding pyramidal frequency scanning action of the receiver of the system.

A trimmer condenser 54 is connected in parallel with each of the condensers comprising plates 68 and 69, which is controlled by means of an aneroid or atmospheric pressure responsive cell 55, as in the embodiment of Figure 2, to accomplish compensation of the mean frequency of the receiving system of Figure 9 for variations of local atmospheric pressure from the normal.

While I have described various specific embodiments of my invention, and a preferred use thereof, as required by the statutes pertaining to the grant of Letters Patent of the United States, it will be clear that modifications in the arrangement and details of the disclosed embodiments, and further uses of the invention, will suggest themselves to those skilled in the pertinent art, within the scope and spirit of the appended claims.

What I claim and desire to secure by Letters Patent of the United States is:

1. In combination, a plurality of objects each located at a variable altitude, means carried by each of said objects for transmitting signals having a frequency characteristic of the altitude of the associated object, means for receiving said signals, means for analyzing said received signals and for deriving therefrom responses separated in time in accordance with the altitudes of the transmitting bodies by periodic scanning of a frequency band including each of said frequencies, a spatially scanning recording means for scanning alternately in opposite directions, and means for providing a correspondence between the spatial scanning action and the said periodic scanning of a frequency band.

2. In combination, a source of a plurality of signals at frequencies distributed within a predetermined spectrum, a receiver, a recording means, means including a shaft for providing periodic spatial scanning of said recording means first in one direction and thereafter in a direction opposite to said one direction, and tuning means rigidly mechanically coupled to said shaft responsive to motion of said shaft for providing periodic frequency scanning of said receiver first in one sense and thereafter in a sense opposite to said one sense, said tuning means for providing periodic frequency scanning and said means for providing periodic spatial scanning of said recording means relatively phased to provide initiation of spatial scanning in synchronism with initiation of frequency scanning.

3. In combination, a source of a plurality of signals at frequencies distributed within a predetermined spectrum, a receiver for frequency scanning the said predetermined spectrum, a recorder, a record receiver, means for moving said recorder in space scanning relation to said record receiver in one direction for a predetermined time and in an opposite direction for an equal predetermined time, and means for coordinating the frequency scanning action of said receiver with the space scanning movement of said recorder to provide a one to one correspondence between each position of said recorder and each frequency of said predetermined spectrum.

4. The combination in accordance with claim 3 wherein said recorder comprises a cylindrical member having at least one pair of oppositely directed helices.

5. The combination in accordance with claim 4 wherein a continuously rotating shaft is provided for actuating said cylindrical member, and wherein said receiver comprises mechanically rotative capacitive means for effecting said frequency scanning, and wherein said capacitive means is actuated directly from said rotating shaft.

6. In combination, a transmitter for transmitting a signal having a characteristic representative of a navigational parameter associated with said transmitter, means comprising a variable capacitor for periodically analyzing said transmitted signal to obtain a periodic signal representative of a value of said parameter, a recorder having a time fed record receiving surface and a periodically scanning record creating means, means responsive to said first named means for controlling said record creating means to provide a periodic record of the value of said parameter, a drive motor, and rigid mechanical coupling between said drive motor, said variable capacitor and said periodically scanning record creating means.

7. In combination, a plurality of transmitters located at distinct and variable altitudes and ranges with respect to a predetermined geographic location, a receiving station at said location, means for controlling each of said transmitters to transmit a signal comprising a frequency representative of the altitude of said transmitter, receiving means at said receiving station comprising means including a rotatable capacitor for periodically frequency scanning a range of frequencies including said altitude representative frequencies and for receiving said signals at times representative of the frequencies of said signals, a time fed record receiving surface located in operative relation to said receiving means, record creating means associated with said record receiving surface, a motor, a rigid mechanical coupling between said motor, said record creating means and said capacitor, for causing said record creating means periodically to scan said record receiving surface in synchronism with said frequency scanning, and means responsive to received signals for actuating said record creating means to provide a record on said record receiving surface.

MARCEL WALLACE.

REFERENCES CITED

The following references are of record in the file of this patent:

UNITED STATES PATENTS

| Number | Name | Date |
| --- | --- | --- |
| 1,959,388 | Shiokawa | May 22, 1934 |
| 2,157,122 | Dunmore | May 9, 1939 |
| 2,252,083 | Luck | Aug. 12, 1941 |
| 2,378,604 | Wallace | June 19, 1945 |
| 2,389,021 | Blain | Nov. 13, 1945 |
| 2,412,310 | Young | Dec. 10, 1946 |
| 2,463,094 | Field et al. | Mar. 1, 1949 |